United States Patent
Gundjian et al.

[11] Patent Number: 6,106,110
[45] Date of Patent: *Aug. 22, 2000

[54] SECURE THERMAL INK JET PRINTING COMPOSITION AND SUBSTRATE AND METHOD AND APPARATUS UTILIZING SAME

[75] Inventors: Arshavir Gundjian, Montreal, Canada; Warren Solodar, Merion Station, Pa.

[73] Assignee: Nocopi Technologies, Inc., West Conshohocken, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 08/728,398

[22] Filed: Oct. 9, 1996

[51] Int. Cl.$^7$ ............................... B41J 2/175; B41J 2/17
[52] U.S. Cl. ......................... 347/86; 347/98; 106/31.14
[58] Field of Search ........................ 106/31.14; 347/101, 347/98, 86; 283/73

[56] References Cited

U.S. PATENT DOCUMENTS

| | | | |
|---|---|---|---|
| 4,525,214 | 6/1985 | Panken | 106/19 |
| 5,421,869 | 6/1995 | Gundjian et al. | 106/21 A |
| 5,525,798 | 6/1996 | Berson et al. | 250/271 |
| 5,541,633 | 7/1996 | Winnk et al. | 347/98 |
| 5,542,971 | 8/1996 | Auslander et al. | 106/21 A |
| 5,764,261 | 6/1998 | Koike et al. | 347/100 |

*Primary Examiner*—John Barlow
*Assistant Examiner*—Helen Mahoney
*Attorney, Agent, or Firm*—Chadbourne & Parke LLP

[57] ABSTRACT

A composition and a method and an apparatus for using the composition for secure thermal ink jet printing on a substrate. The thermal ink jet ink composition is clear and is invisible to an unaided human eye in visible light when printed on the substrate.

32 Claims, 2 Drawing Sheets

SECURE THERMAL INK JET PRINTING COMPOSITION AND SUBSTRATE AND METHOD AND APPARATUS UTILIZING SAME

BACKGROUND OF THE INVENTION

The present invention relates to thermal ink jet printing, and in particular, to a composition, substrate, method and apparatus for obtaining secure thermal ink jet printing.

The desktop ink jet printer using thermal ink jet technology, otherwise known as Bubblejet™ (a trademark of Canon) or OfficeJet™ (a trademark of Hewlett Packard) printing, has become one of the most commonly used printing machines in the office environment. A thermal ink jet printer is a variation on the ink jet printer concept that uses heating elements instead of piezoelectric crystals to shoot ink from nozzles. When the printer is used, it is typically driven by a personal computer.

This is an age of data and information explosion, and the volume of information communicated through different techniques grows on a continuous basis. However, among all the different media used, information transmission via printing remains one of the most important means of communication.

The need to process an enormous volume of printed information has naturally dramatically raised the concern for the security of such information. The concept of security in this context can be classified into two broad types, the ability to seal such information such that one can be assured that only the receiver will be able to unseal and read the information and, to protect the integrity of printed information which cannot be sealed in a tamper-proof manner such that any fraudulent attempt to alter some vital printed information, such as a name, a number, etc., can be easily detected and ideally to enable the original information to be retrieved.

There is currently a great need for a convenient way of achieving printed information security when a document is being printed, when it is being copied or when it is being faxed. U.S. Pat. Nos. 5,424,266, 5,476,830 and 5,532,200 have disclosed methods of rendering printed documents secure by means of latent images obtained by impact printing or by thermal printing, whereby the information remains invisible and hence virtually sealed until revealed through the use of a special highlighter that performs the action equivalent to the opening of the sealed envelope.

Although the known methods are efficient in a certain number of situations, it has been discovered that a dramatically more efficient and convenient device and method based upon the utilization of thermal ink jet printing technology will provide not only a new and more convenient way of rendering printed documents secure by means of latent image printing, but, provide many additional elements of flexibility whereby, for example, originally visible printed information can be checked to see if it is the legitimate original information, and in addition, when the printed information is tampered with in certain situations, it allows one to retrieve the original information.

Conventional thermal ink jet printers have ink reservoirs in the form of ink cartridges which can be refilled or replaced when empty. Single color ink jet printers usually have a single ink jet cartridge which typically stores black ink. Color thermal ink jet printers either use a three cartridge system including cyan, magenta and yellow inks or a four cartridge system which uses cyan, magenta, yellow and black ink cartridges.

The text stored in the computer, or any other text processing equipment memory, is then fed to the printer which prints it in a single color or in any one of the colors which can be achieved with the colored inks.

The printer can be driven by a computer to command the printer to print different parts of the text in different desired colors using conventional printer drivers. Thermal ink jet printing has also been used in high quality color copiers where the color information picked up from a color original by a scanning head of the color copier is appropriately fed to the color printer head of a thermal ink jet printer equipped with a three or four color ink cartridges. Moreover, printing by way of plain paper fax machines have been developed using thermal ink jet technology. The digitized information scanned from a document in a fax machine is used to drive electronic circuitry of the thermal ink jet printhead to produce a fax copy.

The thermal ink jet printing process is a relatively recent development, and U.S. Pat. No. 4,723,129 is one of the earliest dealing with the thermal ink jet method to produce projected droplets of ink for printing on a substrate. The system involves projecting an ink of a mostly aqueous composition from a small nozzle in the form of droplets formed by the instantaneous pressure built up within the ink holding container. Different methods have been disclosed to be used as mechanisms for the instantaneous pressure buildup causing the projection of droplets of ink on the recording paper substrate and thereby effecting printing.

The ink used in a thermal ink jet printing system is expected to meet certain basic requirements: it must be free from clogging problems in the nozzle, it must maintain stable physical properties when in storage without producing any precipitate and it must insure a sharp contrast upon recording. The physical properties must also have magnitudes which fall within certain required ranges, and these relate to viscosity, surface tension, thermal expansion and thermal conductivity. It is generally recognized that the tolerance ranges for the required values of these latter parameters in a thermal ink jet ink are quite wide and that the extreme values of the ranges are about an order of magnitude apart. Since water happens to exhibit physical property values that fall within the required ranges, mostly aqueous inks, where the ink additives do not dramatically disturb the above mentioned properties, would be generally expected to provide functional thermal ink jet ink systems provided such additives also allow the ink to respect the previously mentioned basic, nozzle clogging prevention and stability requirements.

Another consideration used in the formulation of aqueous inks is related to the prevention of the buildup of bacteria. This is achieved through the addition of a minute amount of antiseptic, approximately 0.1% by weight of Dioxine is generally used for this purpose.

SUMMARY OF THE INVENTION

The main object of the present invention is to enable the printing of a secure image which is invisible to the naked or unaided human eye in normal visible light or with the use of ultraviolet or infrared light illumination. The secure image should only be revealed on demand after a substrate is subjected to a subsequent process of image activation.

The present invention therefore provides a system whereby the initial process of information printing instantly seals and secures the printed message in a way conceptually equivalent to the process of securing printed information by enclosing it in an opaque and physically sealed envelope, and the subsequent process of image activation corresponds conceptually to the classical process of opening the envelope to reveal the enclosed message or information.

The present invention is therefore directed to a basically aqueous thermal ink jet printable ink composition that is absolutely clear or transparent at visible light wavelengths and which contains an active component A that constitutes one part of a color reacting pair A & B. When text is printed with this clear ink on a paper or other substrate, it will remain invisible to the unaided eye in normal light.

Ideally, the ink composition containing component A and the component A material itself should also be transparent to wavelengths beyond the visible spectrum both in the ultraviolet and in the infrared region. It is, however, recognized that when quasi-perfect transparency to the visible wavelengths is achieved, the simultaneous quasi-perfect transparency in the ultraviolet and infrared wavelengths becomes more difficult to achieve. This creates the potential problem that an unauthorized person is able to decipher the invisible text on the substrate when the substrate is viewed under ultraviolet or infrared light illumination.

In the present invention, this potential problem has been solved by prescribing an appropriate pretreatment of the substrate. The pretreatment comprises preprinting the substrate that is expected to receive the ink jet information, with two sets of scrambling patterns which are invisible to the unaided eye in normal light. The first set is printed with a clear ink that is highly fluorescent or highly absorbing under ultraviolet light, and the second set is printed with a clear ink that is highly absorbing under infrared illumination. Additives that provide fluorescence and others that provide an infrared absorption are numerous and can be added to printing ink compositions.

The substrate is preferably paper which preferably has a relatively neutral behavior, i.e., it is neither particularly bright nor particularly dark under both ultraviolet and infrared illumination. It is preferred that the paper not be subjected to any special treatments with optical brighteners, absorbers or infrared sensitive coatings. It is thus clear that when the substrate paper treated as described above is subjected to ultraviolet or alternatively to infrared radiation, the scrambling patterns mentioned above will become strongly visible and will overwhelm the eyes of the observer such that any lack of transparency of the thermal ink jet ink printed information at such illumination wavelengths will be completely impossible to be deciphered. Desirable specific scrambling patterns are disclosed in U.S. Pat. No. 4,867,481, although other known patterns can be used.

Given the paper substrate pretreated as described above, when an alphanumeric text or information is printed on this paper using thermal ink jet ink jet printer loaded with the clear reactive ink as described above, it will be evident that it is impossible for an unauthorized observer or intruder to read the printed information either under ordinary ambient lighting conditions or with the help of special ultraviolet or infrared lighting.

When the paper reaches the hands of the legitimate receiver, the latter will be equipped with the appropriate activating device, such as typically is a highlighter which is loaded with the component B of the A+B component pair described above.

When the secured document is highlighted with component B, the combination of component B with the information printed with component A will cause a colorforming reaction which will suddenly reveal the text to the unaided eyes of the reader in visible light.

While the security of the information printed according to the above method is well protected, one may realize that for this printing process to be practically usable, a provision must be made to enable any ordinary receiver to identify by the use of an unaided eye in normal light some vital information, such as the nature and/or the destination of such a secure document. U.S. Pat. No. 5,424,266 discloses a method that allows such identification, wherein the substrate is pretreated by coating selected parts of the paper, e.g., a margin of about one inch width around the periphery of the paper, with a coating solution that contains component B of the A+B component pair. When the ink from the thermal ink jet cartridge containing component A hits the marginal areas of the paper with component B, an image will be formed which is visible to the unaided eye in normal light. Therefore, all information that is desired to become visible to any viewer, such as the identification of the receiver, can be printed in such a precoated area.

A key feature of the present invention is the formulation of clear, reactive and thermal ink jet printable ink compositions that can be loaded into the cartridge of a thermal ink jet printer and used for printing.

The ink compositions according to the present invention comprise a carrier liquid plus the critical, initially colorless latent image recording material. The carrier liquid in one embodiment is essentially aqueous with the addition of cosolvents that insure that the reactive colorless recording material is maintained in solution without causing any nozzle clogging during the useful life of the printing cartridge. In formulating a thermal ink jet ink composition, it is also useful to add to the ink composition other additives in order to regulate the viscosity and the surface tension of the ink. Antibacterial agents are also useful in some thermal ink jet ink compositions. A broad range of such additives are well known in the art and are disclosed, for example, in U.S. Pat. No. 4,723,129. It is possible to develop inks that are perfectly functional thermal ink jet printable reactive inks with very few additives in the composition.

The colorless latent image recording material that is referred to above as component A is preferably chosen from among many pairs of chemicals A and B which each alone are essentially colorless, but when combined, result in a distinctive color which is visible in normal light to the unaided eye. One such group is that of colordevelopers A and leucodyes B.

A number of colordevelopers A lend themselves very appropriately to the formulation of clear reactive thermal ink jet ink compositions for use in the present invention. For example, bisphenols, hydroxybenzoates, multihydroxybenzoates, phenolsulfonates and preferably zinc salicylate and zinc phenolsulfonate are usable as component A of the ink composition. In this case, the component B that must be used later on to activate the invisibly printed information will be from the group of leucodyes of which some examples are the Hilton Davis CK4, which is chemically $C_{31}H_{28}N_2O_3$ and Hilton Davis CK 14, which is chemically $C_{44}H_{56}N_2O_2$. Other leucodyes can also be used.

Since different chemical components A have different degrees of solubility in water, the percentage of the cosolvents needed in the ink compositions will have to vary from one ink formulation to the other. The presence of an appropriate cosolvent is actually necessary in general as a humectant to prevent nozzle clogging as described previously. The cosolvent also allows in the formulation according to the present invention for the adjustment of the surface tension and viscosity of the ink to optimal conditions. The cosolvents used in the present invention are from the family of pyrrolidinones, glycols, glycolethers and glycerol and dimethylsulfoxide. The percentage of cosolvents is in the range of 5 to 50%. The preferred reactive component A in the ink composition is zinc salicylate or zinc phenosulfonate.

The substrate, aside from paper, can be other materials, such as cardboard, or any other porous or semiporous materials, that is, any material that is normally printed on using thermal ink jet printers.

These and other objects and advantages of the present invention are achieved in accordance with the present invention which will be described in more detail hereinafter with reference to the attached drawings, wherein:

DETAILED DESCRIPTION OF THE INVENTION

Figure 2:
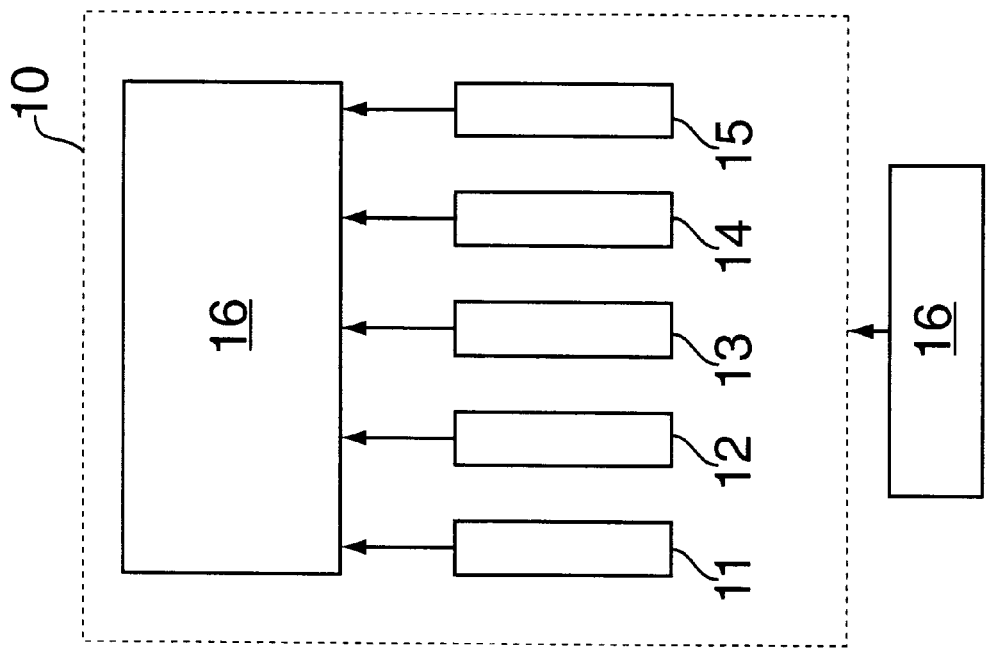
FIG. 2 is block diagram of a printing apparatus according to the present invention for use in the method according to the invention.

The following are specific examples of secure thermal ink jet ink compositions:

EXAMPLE 1

65 grams of distilled water
24 grams of N-methylpyrrilidinones (NMP)
24 grams of zinc salicylate The percentage of zinc salicylate can vary from 1% to 15%. The percentage of the cosolvent NMP is not critical and varies according to the percentage of the zinc salicylate.

EXAMPLE 2

50 grams of distilled water
35 grams of propylene glycol
15 grams of zinc phenolsulfonate The percentage of zinc phenolsulfonate varies from 1 to 20%, and is preferably 6 to 18%. The percentage of the cosolvent propylene glycol is not critical and varies with the percentage of the zinc phenolsulfonate.

EXAMPLE 3

75 grams of water
15 grams of dimethylsulfoxide
10 grams of zinc salicylate

The percentage of the zinc salicylate can vary from 1 to 15%, preferably 6 to 12%. The percentage of the cosolvent dimethylsulfoxide is not critical and varies according to the percentage of the zinc salicylate.

Using any one of the above ink compositions in a thermal ink jet printing apparatus, information printed on a substrate will be revealed to an unaided eye in normal light with the application of component B. For example, a standard highlighter pen filled with component B, which in this case is one or more leucodyes and a solvent carrier, is applied to the substrate. When the component B from the highlighter pen reacts with the information printed with the secure ink composition including component A, the invisible information will be visible to the unaided eye in normal light.

An example of an activator solution (component B) that is used with the above Examples 1–3 is as follows:

2 grams Hilton Davis CK4
2 grams Hilton Davis CK1
0.5 grams Hilton Davis CK35
47.5 grams acetone
28 grams normal propyl alcohol
20 grams Suresol 290

The above combination has 4.5 grams of leucodyes and 95.5 grams of solvent.

The percentages in the component B are not critical. The overall dye content can vary from 1 to 10% in the solvent mix and which can be almost entirely one of the above given solvent components or other solvents typically from the alcohol group. The combination given above has been, however, optimized with respect to the intensity of the print color development versus minimal background color left on the unprinted parts of the paper and finally, good speed of drying of the solvents on paper.

Figure 1:
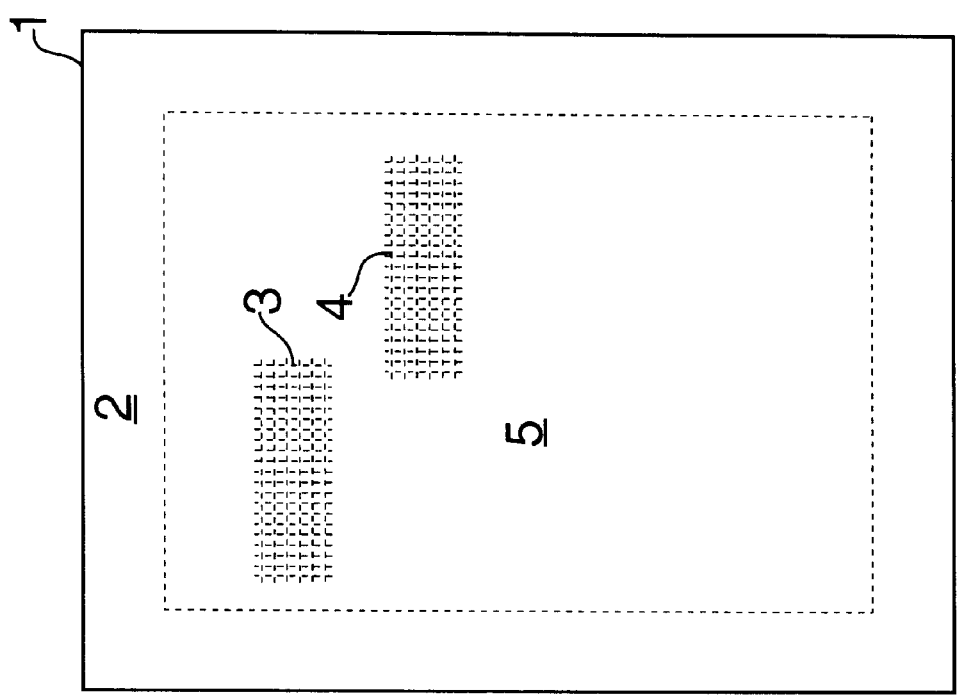
FIG. 1 is a top view of a secure substrate according to the present invention for use in the method and apparatus according to the invention.

Referring now to FIG. 1, a substrate 1 composed of paper or the like is pretreated with a coating of component B in the marginal area 2 and treated in the central area 5 by applying two scrambling patterns 3 and 4. The first scrambling pattern 3 is printed with a composition which is invisible to an unaided human eye in visible light and is strongly visible to an unaided eye in ultraviolet light. The second scrambling pattern 4 is invisible to an unaided human eye in visible light and is strongly visible to an unaided eye in infrared light.

The patterns 3 and 4 can be printed so that the patterns are slightly offset from one another, or they can be printed one over the other, particularly when the material used for printing the patterns 3 and 4 are transparent to the other of infrared or ultraviolet light.

When component A is thermal ink jet printed on substrate 1 in area 2, the printed information becomes visible because of the reaction between component A and component B on the printing surface of substrate 1 in the area 2.

When component A is printed in the central area 5 of substrate 1, the ink composition will be invisible to an unaided eye in normal light when the ink dries. If an unauthorized person seeks to read the invisible information in ultraviolet or infrared light, even if the invisible ink composition fluoresces, the information will not be readable due to the scrambling pattern that will strongly fluoresce. Specifically, pattern 3 will fluoresce under ultraviolet and pattern 4 will strongly absorb under infrared light.

FIG. 2 shows an apparatus for printing in accordance with the present invention. A printer 10 includes a thermal ink jet printhead 16 having an ink reservoir comprising a plurality of ink jet cartridges 11–15 supplying ink thereto under the control of a computer 16 connected to the printer 10.

In accordance with the invention, the printer can have anywhere from 1 to 5 or more cartridges. In a single cartridge system where only the single cartridge 11 is used, cartridge 11 is filled with the clear thermal ink jet ink composition according to the present invention. In this case, only invisible information is printed, and if one desired to print visible information, protected paper having component B coated thereon can be used. In a two cartridge system, cartridge 11 is filled with the clear thermal ink jet ink composition and cartridge 12 is filled with a visible ink composition, such as black or red. In this embodiment, visible and invisible information can be printed as desired. In another embodiment of the present invention where three cartridges 11–13 are present, cartridge 11 is filled with the clear ink composition and cartridges 12 and 13 are filled with other colors. In this embodiment, invisible, black and other color information can be printed as desired. In a four cartridge ink jet printer, cartridge 11 is filled with the clear ink jet composition and cartridges 12–14 are filled with cyan, yellow and magenta colors. In this way, a full color and invisible printing can be achieved. In the five cartridge system shown in FIG. 2, cartridge 11 has the clear ink composition and cartridges 12–15 include cyan, yellow, magenta and black inks. This embodiment allows all types of visible printing, both a color and black, as well as the secure invisible printing, transmission of secure faxes and the obtaining of secure photocopies.

The ink composition, method and apparatus described above can also be used for securing printing, copying and faxing of information in other ways.

Using the apparatus of FIG. 2 which includes both a clear ink cartridge and at least one visible ink cartridge 12–15, the printer 10, under the control of the computer 16, can print in a number of different ways in order to authenticate a document. These different ways are shown with regard to the document 20 in FIG. 3.

In this embodiment, document 20 does not require any pretreatment with scrambling patterns or with precoating in marginal areas, such as in the substrate 1 of FIG. 1.

The document 20 illustrates five different results 21–25 of authenticating methods according to the present invention using the printing apparatus and ink composition according to the present invention.

For example, the text processing software in the computer 16 that drives the printer 10 can be used to overprint critically sensitive parts of the printed text, such as those carrying names and figures with the invisible reactive ink composition. The overprinting can be in the form of a full background block shown at 21 in FIG. 3, or in the form of a simple and invisible repeat printing, either below the visible text, as shown at 22, or above the visible text, as shown at 23. Additionally, the invisible repeat print can coincide with the visible text and be physically underneath the visible text, as shown at 24, or physically above the visible text, as shown at 25.

To the casual observer or one who reads the document 20 in normal light, the invisible text or the blocking background will be absolutely transparent or invisible. On the other hand, an informed authenticator of the document has several means of utilizing the overprint to authenticate critical parts of the document as described hereinafter.

Figure 3:
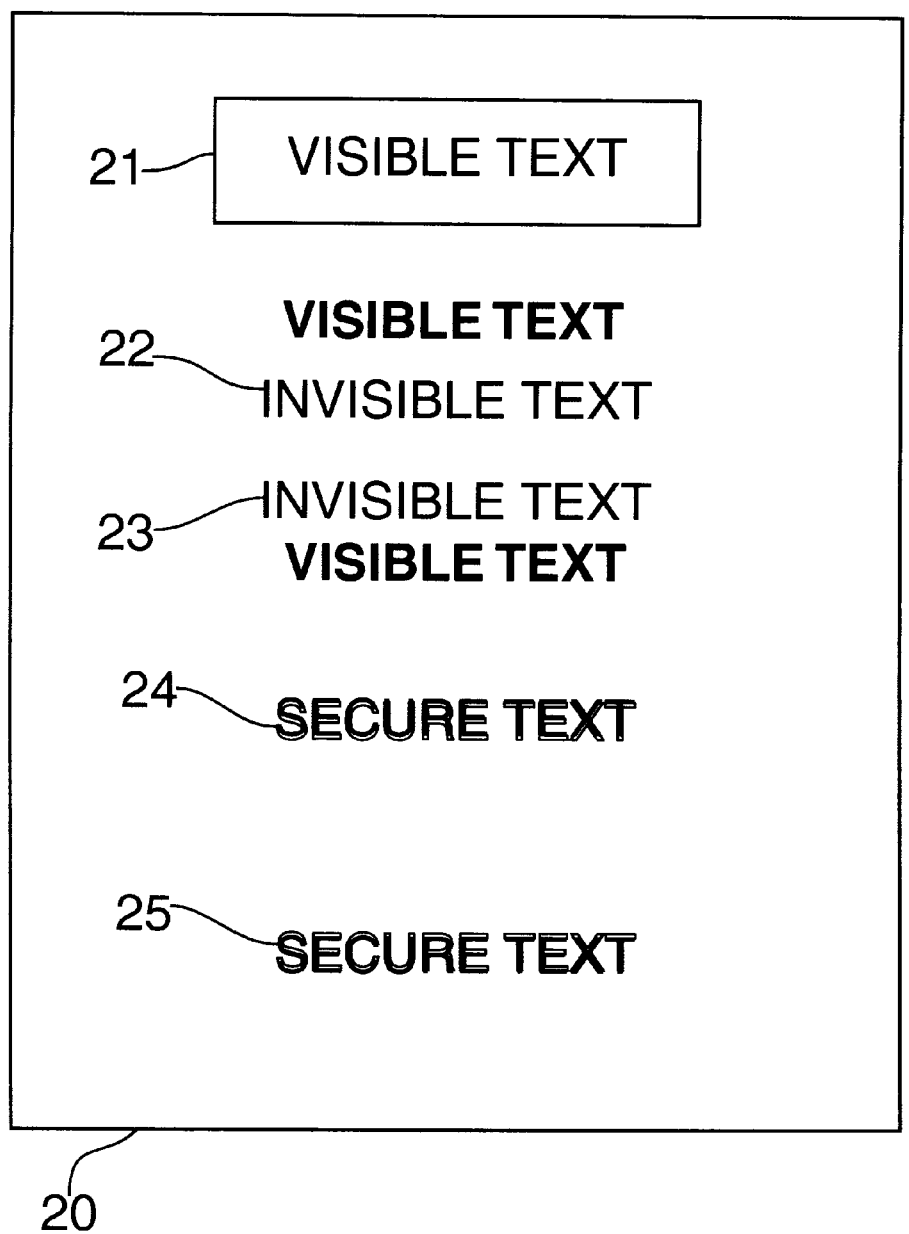
FIG. 3 shows methods of secure printing according to the present invention.

In the case of the block overprint, as shown at 21 in FIG. 3, the authenticator need only highlight the critical information with a highlighter containing component B. When the document is the original and is untampered with, it will be spontaneously and uniformly activated to reveal new color.

If the document has been tampered with or is not an original, it will be revealed as follows. For example, if the document is, in fact, a photocopy of the original, the background block, when highlighted, will remain unreacted. If on the other hand, the original document has been tampered with by, for example, the erasure of a part of the critical information which is replaced with different information, the invisible block area will be damaged, and as a result, highlighting with component B will show the obvious tampering at the site of the critical information.

In the case of the invisible repeat print of the visible information either directly below or directly above the visible information as shown at 22 and 23 of FIG. 3, tampering can also be clearly revealed.

When the authenticator highlights the portion of the document that contains the critical information with the highlighter carrying the component B, if the document is original, there will be a reaction, and the invisible text will become visible. On the other hand, if the document is a copy, there will be no reaction, and this will become immediately apparent.

If the original visible text has been tampered with, a simple comparison of the revealed invisible text when activated will clearly establish that the visible information had been changed.

The use of the coinciding repeat print of the visible and invisible information either below or above the visible text, as shown at 24 and 25, can also be used for authentication.

In this embodiment, the ink formulation should include the leucodyes chosen from the specific group, Hilton Davis CK14 which is $C_{44}H_{56}N_2O_2$ and other leucodyes specified in U.S. Pat. No. 5,421,869 which are invisible in visible light even when activated, but fluoresce under ultraviolet light when activated. When the document is the original untampered version, the result of the interaction between the colordeveloper and the leucodyes when activated with a highlighter, results in the generation of a fluorescence along the profile of the visible text. This establishes the authenticity of the information. If, on the other hand, the characters were tampered with, the following would be expected to happen. When the secure ink is printed above, the characters that have been tampered with will not show an activated fluorescence after being highlighted and tampering will thus show up obviously under examination with an ultraviolet light source. Since the ink that prints invisibly is absorbed in the paper substrate when printed below and is inconspicuous to the person who will have erased the visible marks, the invisible print will remain embedded in the paper after the erasing operation. When the highlighter is applied, the invisible marks will fluoresce and give away the original information that was meant to be printed on the document.

The above provides an extremely simple and yet functional method of protecting printed documents against tampering when a thermal ink jet ink jet printer is used, including an ink jet cartridge filled with inks as described above.

It is understood that the embodiments described hereinabove are merely illustrative and are not intended to limit the scope of the invention. It is realized that various changes, alterations, rearrangements and modifications can be made by those skilled in the art without substantially departing from the spirit and scope of the present invention.

What is claimed is:

1. A thermal ink jet printer ink cartridge comprising a container for storing ink and a thermal ink jet ink composition stored therein, wherein said thermal ink jet ink composition is a colorless thermal ink jet ink composition comprising:

a) a carrier liquid comprising water; and
   b) a latent image recording material comprising a first component A of a color reacting pair A+B;

and wherein information printed on a substrate with said colorless thermal ink jet ink composition is invisible to an unaided human eye in visible light and undecipherable to an unaided human eye in infrared light and ultraviolet light, but is reactable with an activating composition comprising a second component B of said color reacting pair to produce a colored reaction product A+B which is visible to an unaided human eye in visible light.

2. A thermal ink jet printer ink cartridge according to claim 1, wherein the colorless thermal ink jet ink composition held therein comprises a carrier liquid which comprises a cosolvent.

3. A thermal ink jet printer ink cartridge according to claim 1, wherein the colorless thermal ink jet ink composition held therein comprises a carrier liquid which comprises an antibacterial agent.

4. A thermal ink jet printer ink cartridge according to claim 1, wherein the colorless thermal ink jet ink composition held therein comprises a component A which comprises a color developer.

5. A thermal ink jet printer ink cartridge according to claim 4, wherein the colorless thermal ink jet ink composition held therein comprises a component A which comprises a color developer, and the color developer is selected from the group consisting of bisphenols, hydroxybenzoates, multi-hydroxybenzoates and phenolsulfonates.

6. A thermal ink jet printer ink cartridge according to claim 5, wherein the colorless thermal ink jet ink composition held therein comprises a component A which comprises a color developer, and the color developer is zinc salicylate.

7. A thermal ink jet printer ink cartridge according to claim 6, wherein the colorless thermal ink jet ink composition held therein further comprises a cosolvent selected from the group consisting of pyrrolidinones, glycols, glycolethers, glycerol and dimethylsulfoxide.

8. A thermal ink jet printer ink cartridge according to claim 7, wherein the colorless thermal ink jet ink composition held therein comprises N-methylpyrrolidinone and 1 to 15% of zinc salicylate.

9. A thermal ink jet printer ink cartridge according to claim 8, wherein the colorless thermal ink jet ink composition held therein comprises N-methylpyrrolidinone and 6 to 12% of zinc salicylate.

10. A thermal ink jet printer ink cartridge according to claim 7, wherein the colorless thermal ink jet ink composition held therein comprises dimethylsulfoxide and 1 to 15% of zinc salicylate.

11. A thermal ink jet printer ink cartridge according to claim 10, wherein the colorless thermal ink jet ink composition held therein comprises dimethylsulfoxide and 6 to 12% of zinc salicylate.

12. A thermal ink jet printer ink cartridge according to claim 5, wherein the colorless thermal ink jet ink composition held therein comprises a component A which comprises a color developer, and the color developer is zinc phenolsulfonate.

13. A thermal ink jet printer ink cartridge according to claim 12, wherein the colorless thermal ink jet ink composition held therein further comprises a cosolvent selected from the group consisting of pyrrolidinones, glycols, glycolethers, glycerol and dimethylsulfoxide.

14. A thermal ink jet printer ink cartridge according to claim 13, wherein the colorless thermal ink jet ink composition held therein comprises propylene glycol and 1 to 20% of zinc phenolsulfonate.

15. A thermal ink jet printer ink cartridge according to claim 14, wherein the colorless thermal ink jet ink composition held therein comprises propylene glycol and 6 to 18% of zinc-phenolsulfonate.

16. A thermal ink jet printer ink cartridge according to any one of claims 1–15, which is the ink cartridge of a single ink cartridge system.

17. A thermal ink jet printer ink cartridge according to any one of claims 1–15, which is one ink cartridge in a multiple ink cartridge system.

18. A colorless thermal ink jet ink composition suitable for use in a thermal ink jet printer comprising:
  a) a carrier liquid comprising water; and
  b) a latent image recording material comprising a first component A of a color reacting pair A+B;
wherein information printed on a substrate with said colorless thermal ink jet ink composition is invisible to an unaided human eye in visible light and undecipherable to an unaided human eye in infrared light and ultraviolet light, but is reactable with an activating composition comprising a second component B of said color reacting pair to produce a colored reaction product A+B which is visible to an unaided human eye in visible light.

19. A colorless thermal ink jet ink composition according to claim 18, wherein the carrier liquid comprises a cosolvent.

20. A colorless thermal ink jet ink composition according to claim 18, wherein the carrier liquid comprises an antibacterial agent.

21. A colorless thermal ink jet ink composition according to claim 18, wherein component A comprises a color developer.

22. A colorless thermal ink jet ink composition according to claim 21, wherein the color developer is selected from the group consisting of bisphenols, hydroxybenzoates, multi-hydroxybenzoates and phenolsulfonates.

23. A colorless thermal ink jet ink composition according to claim 22, wherein the color developer is zinc salicylate.

24. A colorless thermal ink jet ink composition according to claim 23, which further comprises a cosolvent selected from the group consisting of pyrrolidinones, glycols, glycolethers, glycerol and dimethylsulfoxide.

25. A colorless thermal ink jet ink composition according to claim 24, which comprises N-methylpyrrolidinone and 1 to 15% of zinc salicylate.

26. A colorless thermal ink jet ink composition according to claim 25, which comprises N-methylpyrrolidinone and 6 to 12% of zinc salicylate.

27. A colorless thermal ink jet ink composition according to claim 24, which comprises dimethylsulfoxide and 1 to 15% of zinc salicylate.

28. A colorless thermal ink jet ink composition according to claim 27, which comprises dimethylsulfoxide and 6 to 12% of zinc salicylate.

29. A colorless thermal ink jet ink composition according to claim 22, wherein the color developer is zinc phenolsulfonate.

30. A colorless thermal ink jet ink composition according to claim 29, which further comprises a cosolvent selected from the group consisting of pyrrolidinones, glycols, glycolethers, glycerol and dimethylsulfoxide.

31. A colorless thermal ink jet ink composition according to claim 30, which comprises propylene glycol and 1 to 20% of zinc phenolsulfonate.

32. A colorless thermal ink jet ink composition according to claim 31, which comprises propylene glycol and 6 to 18% of zinc phenolsulfonate.

* * * * *